Nov. 25, 1952 J. E. LUCAS 2,619,319
HYDRAULIC AUTOMOBILE LIFTING DEVICE
Filed Aug. 11, 1948 3 Sheets-Sheet 1
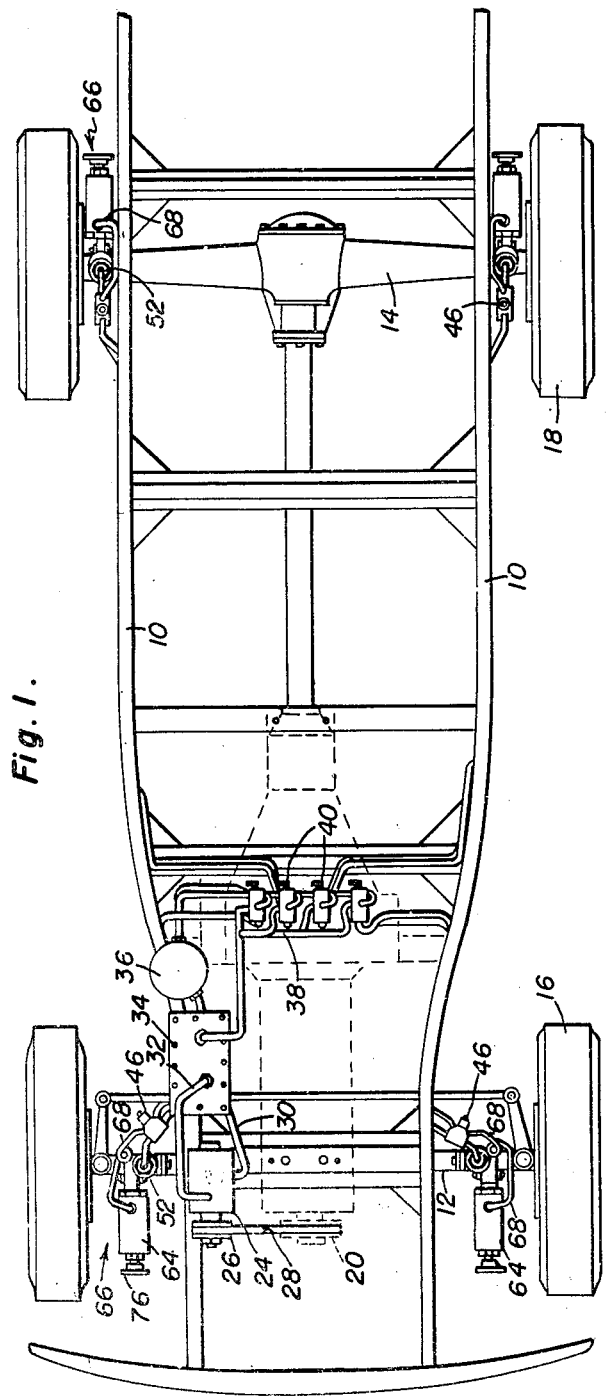
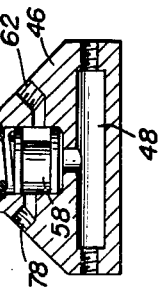
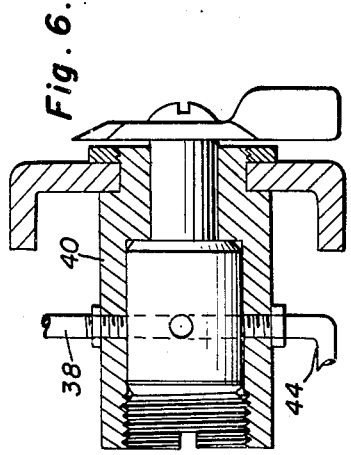
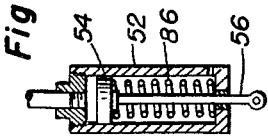
Joseph E. Lucas
INVENTOR.

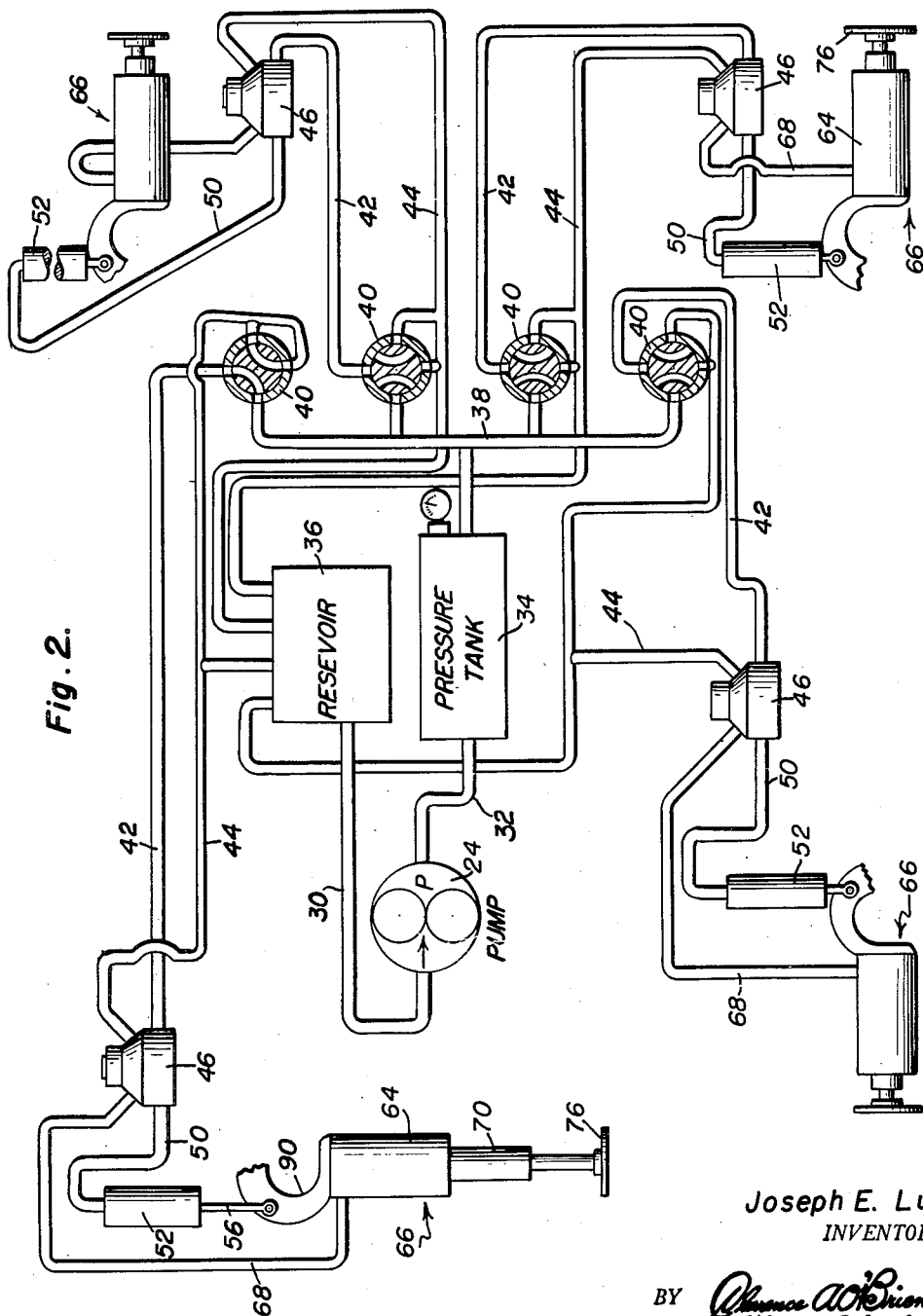

Nov. 25, 1952  J. E. LUCAS  2,619,319
HYDRAULIC AUTOMOBILE LIFTING DEVICE
Filed Aug. 11, 1948  3 Sheets-Sheet 3

Joseph E. Lucas
INVENTOR.

Patented Nov. 25, 1952

2,619,319

UNITED STATES PATENT OFFICE 2,619,319

HYDRAULIC AUTOMOBILE LIFTING DEVICE

Joseph E. Lucas, Longview, Tex., assignor, by direct and mesne assignments, of thirteen-twentieths to Richard T. Wells, Longview, Tex., and one-twentieth to John S. T. McDowell, Longview, Tex.

Application August 11, 1948, Serial No. 43,595

3 Claims. (Cl. 254—86)

This invention relates generally to hydraulic jacks, and more particularly to a hydraulic jack system for automotive vehicles whereby different portions of the vehicle can be selectively or simultaneously elevated.

In brief, the invention comprises the combination with a vehicle chassis of a pump, a fluid reservoir and a pressure tank connected with the pump, and a plurality of manually operable valves controlling flow of fluid under pressure to by-pass valves connected to a plurality of hydraulic jacks, each jack being operatively associated with a cylinder having a piston rod adapted to pivot the jacks into operative and inoperative positions.

The primary object of this invention is to provide a hydraulic system for automotive vehicles which will greatly facilitate and simplify the jacking of any desired portion of the vehicle or the complete vehicle.

Another object of this invention, of a specific nature, is to provide such means as will allow the proper placement of hydraulic jacks in operative positions adjacent the ends of the front end rear axles and to extend these jacks, all with a minimum of structural equipment, the collapsing of the jacks and the pivoting thereof into inoperative positions being equally easily accomplished.

Still another object of this invention is to provide a hydraulic jack system for automotive vehicles of a character which may be easily manufactured as an accessory, as well as standard equipment, for many different kinds of automotive vehicles.

And a last object to be mentioned specifically is to provide a hydraulic jack system which is relatively inexpensive and practicable to manufacture, which is safe as well as convenient to operate, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a plan view of a chassis of an automotive vehicle with this invention incorporated thereon;

Figure 2 is a diagrammatic view designed to illustrate the principles of operation and the general arrangement of the elements of this invention;

Figure 5 is a vertical sectional view of what is hereinafter referred to simply as the cylinder;

Figure 6 is an enlarged detail view of one of the manually operated valves; and

Figure 7 is an enlarged detail view of one of the by-pass valves.

Similar characters of reference designate similar or identical elements and portions throughout the specification and throughout the several views in the drawings.

Figure 3:
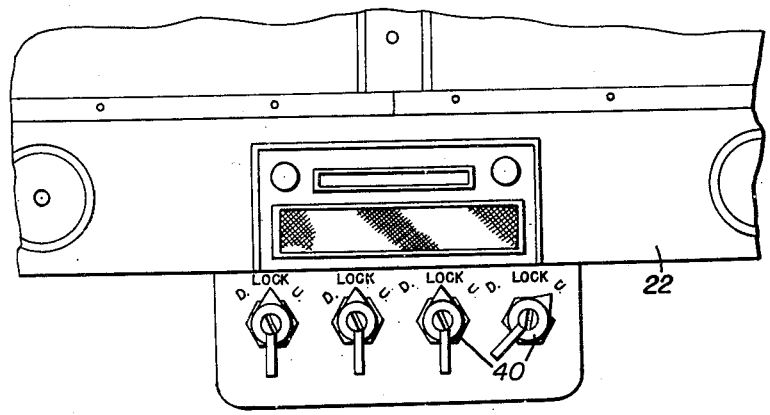
Figure 3 is a fragmentary elevational view of a portion of an instrument board with the manually operable valves mounted thereon.
Figure 4:
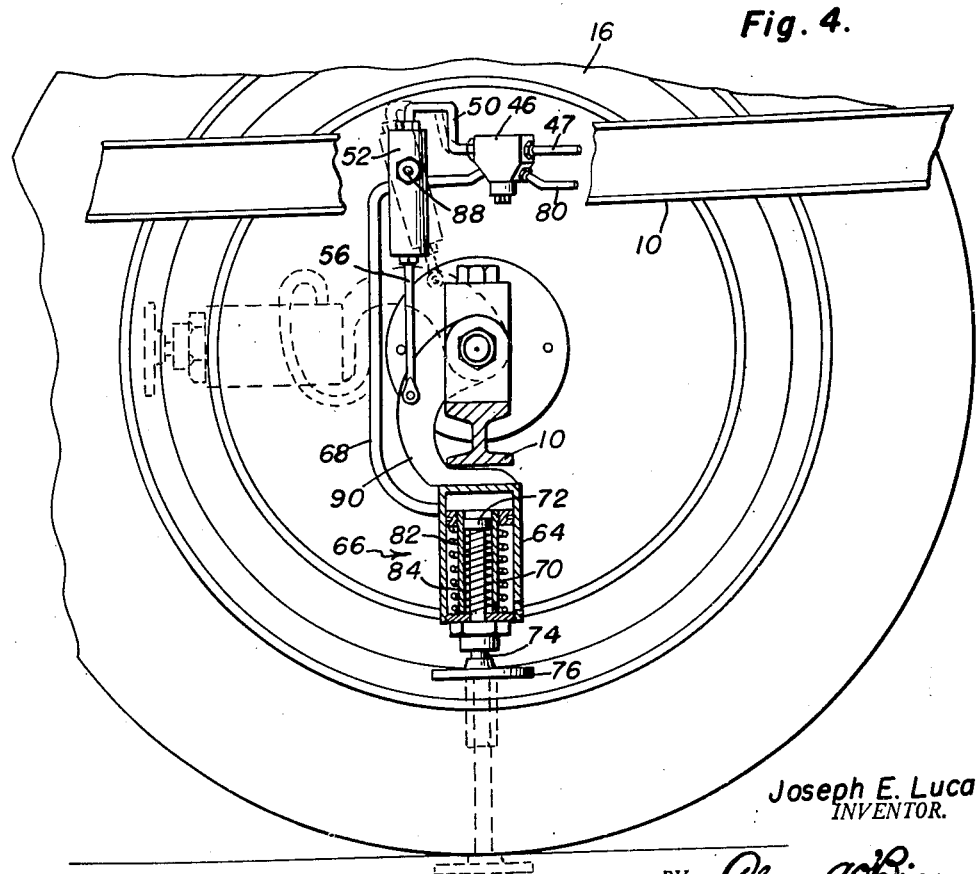
Figure 4 is a fragmentary enlarged view, partly in elevation and partly in vertical section, of a portion of this invention located adjacent each wheel of the automotive vehicle.

Referring now to the drawings in detail, a suitable environment is exemplified by an automobile chassis having side frame members 10, a front axle 12, rear axle housing 14, front and rear wheels 16 and 18, an engine having a drive pulley 20 which may be the regular fan belt drive pulley, and an instrument board 22.

A pump 24 mounted on the engine or on an adjacent portion of the chassis is driven by a pulley 26 connected to the pulley 20 by a belt 28. In this embodiment, the pump 24 is constantly driven while the engine is being operated. This pump is connected by pipes 30 and 32 to a reservoir 36 and a pressure tank 34, respectively, the reservoir and tank being also supported on the chassis. The pressure tank is provided with a distributor head 38 leading to valve means taking the form in the present embodiment of this invention of four similar manually operated three-way valves 40 mounted on the instrument board 22.

Although not illustrated in the drawing, it will be understood that suitable means should be provided to prevent inadvertent shifting of these valves during the normal operation of the vehicle. Pressure lines 42 and fluid return pipes 44 connect these valves 40 with an equal number of by-pass valves 46, the detailed construction of which is shown in Figure 7. If reference be had to Figures 2 and 7, it will be clear how, upon the shifting of the corresponding valve 40 to the "up" position, or vehicle raising position, fluid under pressure will be routed through one of the pressure lines 42 to a main channel 48 in the valve 46 and to a flexible tube 50 connected to a cylinder 52. When the piston 54 in the cylinder 52 has moved the piston rod 56 to the limit of its travel, the pressure will increase in the channel 48 sufficiently to move the valve plunger 58 against the action of the valve spring 60 to open the intermediate pressure channel 62 leading to the cylinder 64 of the corresponding hydraulic jack which is generally indicated at 66, a flexible tube 68 being used to connect the cylinder 64 to one end of the channel 62.

It is preferred that the jacks 66 will be of double-acting type with an inner cylinder 70 having an inner piston 72 carrying a piston rod 74 and a foot 76. When the jack concerned is fully extended, the pressure in the valve 46 will again increase and a high pressure channel 78 will be opened, allowing fluid to flow into one of the return pipes 44, each of which has a branch leading to the reservoir 36 and another branch leading to the corresponding manually-operated valve 40. The pump 24 will maintain pressure in the tank 24 to hold the plunger 58 against the action of the spring 60.

To collapse and return the jack 66 to inoperative position the valve 40 is moved to down position so that the tank 34 and the pressure line 42 are connected to the reservoir 36. The release of the pressure in passage 48 allows the plunger 50 to close and connect tube 68 to return pipe 44. Each jack has springs 82 and 84 which collapse the jack, forcing the fluid contained therein back to the reservoir when the corresponding valve 40 is turned to a "down" position, and the cylinders 52 are equipped with similarly acting springs 86, as indicated in Figure 5.

Since the cylinders 52 are pivoted, as at 88, and the jacks 66 are also pivoted on the chassis by means of arms 90, the springs 82, 84, and 86 will cause the collapse and pivoting of the jacks into inoperative positions, ordinarily substantially horizontal, at the levels of the front axle 12 and the rear axle housing 14.

As indicated by the positioning of three of the valves 40 in Figure 2, these valves will be turned to "lock" positions so that a fluid lock will supplement the action of the said springs in holding the jacks in inoperative positions.

The operation of this invention will be clearly understood from a consideration of the foregoing description of the mechanical details thereof, taken in connection with the drawings and the above recitation of the objects sought to be achieved by this invention. It should be noted that, during the collapse of the jacks and pivoting thereof into inoperative positions, the proper positioning of the corresponding valves 40 will allow fluid to be forced back into the reservoir through the pressure lines 42 as well as through the fluid return pipes 44. The action of the jacks is reasonably rapid, therefore, both during the movement to inoperative positions as well as movement thereof into operative positions, the latter movement being accelerated by provision of the pressure tank 34. In this connection, it will be clear how the initial downward pivoting of the jacks will be quickly accomplished as a result of the action of the pressure tank 34, whereafter the actual elevation of the chassis will be accomplished. The action of the springs 82, 84, and 86 will, obviously, cause the rapid collapse of the jacks and the similarly rapid pivoting of the jacks when the valves 40 are turned to "up" positions. It will also be clear how the jacks may be selectively or simultaneously operated merely by the suitable manipulation of the valves 40.

Obviously, many minor variations in the exact construction and proportionment of the various elements of this invention may be resorted to without departure from the spirit of this invention. Accordingly, the scope of this invention should be determined only as limited by a proper interpretation of the terminology used in the subjoined claims.

Having described the invention, what is claimed as new is:

1. In combination with a motor vehicle chassis, a hydraulic jack system comprising, a fluid pump, a fluid reservoir, a pressure tank, pipes connecting said pump in operative relation between said reservoir and said pressure tank, a jack assembly for each corner of said chassis, each jack assembly including a hydraulic jack pivoted on said chassis, a fluid cylinder pivotally mounted on said chassis above said jack, a piston in said cylinder, said piston being pivotally connected to said jack, a fluid line from said tank to said cylinder, a control valve in said line to control the flow of fluid to said cylinder to pivot said jack on said chassis, a pressure responsive valve in said line, a by-pass channel in said pressure responsive valve, a flexible tube connecting said channel to said hydraulic jack, said valve opening in response to predetermined pressure to supply fluid to said jack, a second channel in said pressure responsive valve, a fluid return pipe connecting said second channel and said reservoir, a return pipe from said control valve to said reservoir, said control valve being operative to connect said cylinder and said jack to said reservoir, said cylinder and said jack each including spring means to collapse the same when pressure is released therefrom, whereby operation of said control valve allows fluid under pressure to pivot said jack downwardly into operative position beneath said vehicle chassis and thereafter to extend said jack, while further manipulation of said control valve allows said spring means to collapse said jack and to pivot said jack upwardly into inoperative position.

2. A jack system according to claim 1 and wherein said pump is connected to more than one jack, one of said cylinders and one of said control valves being operatively associated with each jack, said control valve being selectively manipulatable to operate and to lock said jacks in operative as well as inoperative positions.

3. A jack system according to claim 1 and wherein said pressure responsive valve has a main channel connected to said cylinder, an intermediate pressure by-pass channel connected to said hydraulic jack, and a high pressure channel connected to said fluid return pipe, whereby as the pressure is increased the jack is first pivoted into operative position, then extended, and the excess fluid allowed to return to the reservoir until the pump is stopped.

JOSEPH E. LUCAS.

REFERENCES CITED

The following references are of record in the file of this patent:

UNITED STATES PATENTS

| Number | Name | Date |
|---|---|---|
| 1,560,460 | Yates et al. | Nov. 3, 1925 |
| 1,583,189 | Scott | May 4, 1926 |
| 1,834,295 | Stevenson | Dec. 1, 1931 |
| 1,849,500 | McKeage | Mar. 15, 1932 |
| 1,957,151 | Pollard | May 1, 1934 |
| 2,056,954 | Bryant | Oct. 13, 1936 |
| 2,237,167 | Skavinsky | Apr. 1, 1941 |
| 2,353,855 | Schwarz | July 13, 1944 |
| 2,546,203 | Tucker | Mar. 27, 1951 |